March 7, 1961
M. APSTEIN
2,974,242
LOW-INERTIA INDUCTION MOTOR ROTOR
Filed Jan. 22, 1957
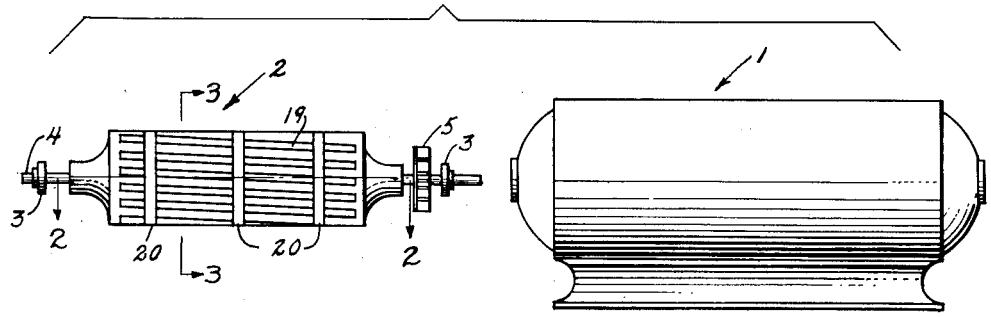
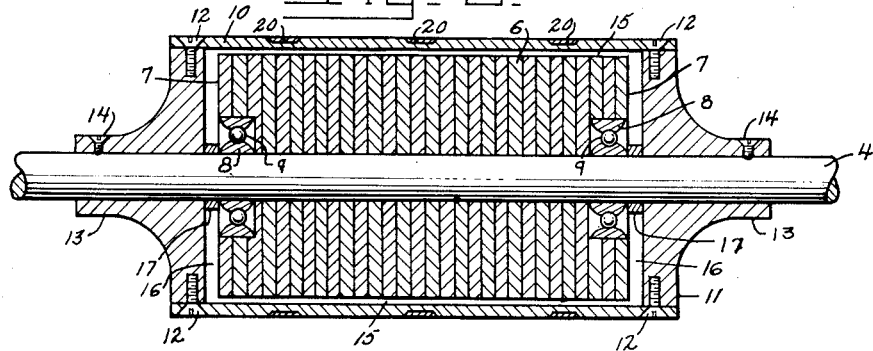
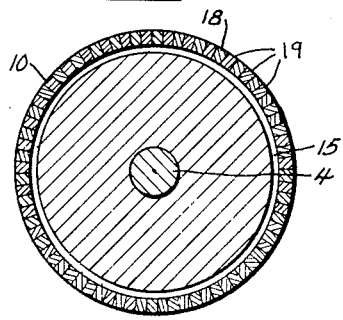
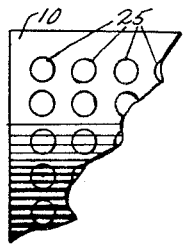
INVENTOR.
Maurice Apstein
BY

2,974,242
LOW-INERTIA INDUCTION MOTOR ROTOR

Maurice Apstein, 4611 Maple Ave., Bethesda, Md.

Filed Jan. 22, 1957, Ser. No. 635,553

3 Claims. (Cl. 310—266)

(Granted under Title 35, U.S. Code (1952), sec. 266)

The invention described herein may be manufactured and used by or for the Government for governmental purposes without the payment to me of any royalty thereon.

This invention relates, generally, to a novel type of motor capable of extremely fast starting and reversing. More particularly, this invention contemplates a novel rotor structure peculiarly adapted to enhance the accomplishment of this end.

Previous attempts to provide a high torque/inertia ratio have been made using hollow rotors of a conductive material, or a plated magnetic sleeve, both having a free-running internal cylinder to complete the magnetic circuit. These attempts have resulted in little improvement in the torque/inertia ratio of the motor and consequently little reduction in starting and reversal time. To obtain a significant reduction in inertia, the thickness of the rotating sleeve must be no more than substantially 5% of the rotor diameter. An iron sleeve of this wall thickness has far too high a resistance to generate sufficient torque for good performance. Therefore, the torque/inertia ratio remains substantially the same. A copper or aluminum sleeve results in too large an air gap for efficient operation. A composite sleeve of silver-plated iron affords only slight improvement because the plating thickness tends to increase both air gap and inertia. A thickness of plating which results in appreciable lowering of the rotor resistance, necessarily results in air gaps comparable to those of the drag cup motor.

It is therefore the general object of this invention to provide a motor possessing a relatively high rotor torque/inertia ratio resulting in a substantial reduction in starting and reversing time.

The general object of the present invention is accomplished by the provision of a rotor comprising a freely rotatable inner ferromagnetic core disposed between the rotor shaft and a thin, lightweight, low resistance sleeve, the latter having embedded therein magnetic inserts. These magnetic inserts are spaced at regular intervals and dimensioned so as to incorporate in the sleeve the desired relationship of resistance to effective magnetic flux permeability.

The specific nature of the invention as well as other objects, uses and advantages thereof will clearly appear from the following description and from the accompanying drawing, in which:

Figure 1 is a side elevational view of a motor, with the rotor of this invention disassembled from a conventional stator.

Figure 2 is an enlarged longitudinal section of the rotor embodying this invention, taken approximately on the line 2—2 of Figure 1.

Figure 3 is an enlarged cross-section of the rotor, taken along the line 3—3 of Figure 1.

Figure 4 is a fragmentary view of a modified rotor sleeve of this invention.

Referring to Figure 1, the stator, constituting an essential part of the novel motor, is designated generally by numeral 1. The stator, being of the conventional induction motor type, has not been shown in detail since the structure, components, and mode of assembly are deemed to be obvious to one skilled in the art. The rotor of the novel motor is designated generally by number 2. The unanticipated results achieved by this invention are most proximately related to the unique design of this rotor.

The rotor 2 is conveniently mounted within the housing of stator 1 by any suitable means. As shown in Figure 1, and as being merely illustrative, bearing elements 3 can be supported on rotor shaft 4 for facilitating proper mounting of the rotor 2 inside the housing of stator 1. Suitable motor fan means 5 is likewise mounted on shaft 4. It must be understood that any appropriate fan structure can be utilized, if a fan is thought to be essential.

The essence of the novel motor resides in the rotor 2, in which, a freely rotatable, cylindrical, ferromagnetic core 6 is mounted on rotor shaft 4. Core 6 may comprise soft iron laminae, but other magnetic material and core structure may be resorted to, since the principal function of the core is to complete a magnetic circuit. However, for satisfactory and efficient results, the freely rotatable core is preferably fabricated from ferromagnetic laminae. The end portions 7 of core 6 are counterbored at 8 to provide recessed portions in which ball bearing means 9 are conveniently disposed. Any type of bearing means may be employed to promote the desired free rotation of the core 6 relative to the shaft 4. Core 6 is employed to convey magnetic flux and, accordingly, complete the magnetic circuit initiated by the stator 1. The free rotating feature of the core 6, independently of rotor shaft 4, is desirable because this arrangement maintains core loss at a minimum. The core losses that would be produced would be at slip frequency, rather than at supply frequency, because of the rotating feature of the core. Thus, motor efficiency would undoubtedly be higher.

Concentrically mounted with, and providing a housing for, core 6, is cylindrical, conductive, metallic shell 10, suitably connected to rotor shaft 4 and rotatable therewith. This connection may comprise circular plate members 11, possessing sufficient thickness to permit rigid mounting of the shell 10 therewith. As illustrated in Figure 2, screw means 12 provide this rigid mounting, but, as is apparent, any form of rigid mounting means may be employed. Coaxially with plate 11, and integrally formed therewith, bosses 13 are provided, presenting suitable means for rigid attachment of plate 11 to rotor shaft 4 by means of locking screws 14. The connection utilized in rendering the shell 10 rotatable with shaft 4, is not necessarily limited to the connection described above, but to any connection accomplishing the desired results.

The shell 10 and plate 11 are structurally of such a size, relative to core 6, that clearance is provided for any possible rotation of core 6. This clearance is designated at 15 and 16 in Figure 2. Clearance 15 is of relatively small magnitude, minimizing the air gap to a negligible quantity between the exterior surface of the core 6 and interior surface of the shell 10. For maximum efficiency, it is also important that the air gap between the exterior surface of the shell 10 and interior of the associated parts of stator 1, when the former is mounted in the latter, to be no larger than necessary to permit free rotation. Clearance 16 is provided between the edges of core 6 and the interior surface of plates 11, as for example, by collars 17, mounted on shaft 4.

As is well known in the art to which this invention pertains, in general, the stator, when properly wound and the motor is connected to a suitable source of alternating current, will produce a rotating magnetic field. This magnetic field induces in the shell 10 electrical currents, thus imparting rotation to the shell. The motor starting time, that is, from a rotor stop position to the instant the rotor acquires constant speed, and motor reversal time, that is, from the instant that rotor constant speed in one direction begins to lessen, to the instant that constant speed in the reverse direction is arrived at, have been found to be dependent on the rotor torque/inertia ratio. The higher the rotor torque/inertia ratio, the quicker will be the motor response to starting and reversing.

The preferable dimensioning of the rotor incorporates a length to diameter ratio approximating three to one, as is commonly done for commercial low inertia servo motors. However, notwithstanding the rotor length to diameter ratio, the essential critical feature for accomplishing the relatively high rotor torque/inertia ratio of this invention resides in the provision of a sleeve 10 having novel characteristics in its relationship of sleeve resistance to effective sleeve magnetic flux permeability.

The metallic sleeve 10, possessing relatively low resistance, is provided with slots 18, extending along a major portion of the shell length as shown, in which, are embedded inserts or bars 19. The interior side surfaces of slots 18 can lie in planes extending radially from the longitudinal axis of the rotor. The slots 18 are formed in the sleeve 10 in any appropriate manner, and the means employed for securing the bars 19 in slots 18 can be by frictionally fitting the bars 19 into slots 18. To further prevent the bars 19 from becoming disassociated from the slots 18, wire bands 20 are circumferentially applied to the exterior surface of sleeve 10 as shown in the drawing. The method and means for embedding bars 19 in slots 18 can be accomplished in any desired manner provided they are relatively rigidly secured therein. As illustrated in Figure 1, the slots 18 and bars 19 are preferably slightly skew with respect to the longitudinal axis of the rotor to obviate any parasitic torques that may develop in the shell. Also, it was found that if the bars 19 were parallel to the longitudinal axis of the rotor, an undesirable "singing" effect developed at the natural vibration frequency of the bars 19, probably due to a small magnetic unbalance.

The inserts 19 may assume the form of discs of suitable configuration inserted in corresponding openings in sleeve 10. For example, the inserts 19 may be threaded circular discs 25 inserted in threaded openings in sleeve 10. These discs are preferably arranged in series along parallel axis lines as indicated in Figure 4, so that paths are available for induced currents in the sleeve, and motor air gap is substantially eliminated.

The inserts 19 and 25 can be fabricated from relatively soft, high permeability, ferromagnetic material, such as commercially available Armco iron. Also, vanadium-permendur and pure permendur have been found to be very satisfactory. Pure permendur is a relatively soft, conductive, magnetic alloy material of cobalt and iron. The essential characteristics of these materials are that they be magnetic and possess relatively high saturation flux density. The effective resistance of the sleeve 10 and air gap may thus be kept at a minimum, and rotor torque may be made comparable to that of conventional motors.

The sleeve 10 is preferably fabricated from a lightweight, low resistance metal such as aluminum or magnesium, so that rotor inertia can be reduced to a low value, and rotor torque kept at a comparatively high value.

A comparison of a 3-phase, 60 cycle, ¼ H.P. conventional squirrel-cage induction motor with a motor of the same rating, incorporating the novel rotor of this invention, will reveal the unanticipated results achieved in starting and reversing time while approximating the running performance of the conventional motor.

A motor with a rotor having an aluminum sleeve with a thickness decreased substantially to 0.10 inch, which was approximately only 5% of the rotor diameter, with Armco iron inserts, had a starting time approximately 5 to 6 times faster, and a reversal time approximately 9 to 10 times faster than that of a conventional general purpose motor. As compared with specially designed prior art low-induction motors, the starting and reversing times obtained are approximately twice as fast.

A motor with a rotor having an aluminum sleeve further decreased in thickness to 0.05 inch, with vanadium-permendur inserts, had a starting time approximately 6 to 7 times faster, and a reversal time approximately 11 to 12 times faster than that of a conventional general purpose motor. Since Armco iron inserts of the same width as used in the 0.10 inch thick aluminum sleeve would have resulted in increasing the rotor resistance two fold, vanadium-permendur inserts of reduced width were used because of the lower volume resistivity of the latter. The saturation flux density of vanadium-permendur is approximately 30% higher than that of Armco iron, permitting the inserts to be only three-fourths the width of the Armco iron inserts and resulting in limiting the increase in rotor resistance to 25% over the rotor having the 0.10 inch aluminum sleeve.

A motor with a rotor having a magnesium sleeve of 0.10 inch thickness, with vanadium-permendur inserts, produced a starting time approximately 12 times faster and a reversal time approximately 14 to 15 times faster than that of a conventional general purpose motor. This is 2 to 3 times faster than can be obtained from the specially designed low inertia motors of the prior art.

Pure permendur, being lower in resistance than either Armco iron or vanadium-permendur, would obviously produce improved results. Skillful production methods in fabricating the rotor sleeve and inserts to further decrease the effective air gaps would result in still faster starting and reversal times.

As will be evident to those skilled in the art, the rotor torque/inertia ratio is effectively increased by the aforedescribed means for decreasing substantially rotor inertia while still maintaining rotor torque, motor air gap, and running performance comparable to those of a conventional squirrel-cage induction motor. The magnetic inserts, extending over a major portion of the shell lengths, tend to reduce air gap, while the shell in conjunction with the inserts produce relatively high rotor torque and reduce rotor inertia. The structural proportionment of the inserts, such as quantity, interval and width, with respect to the shell is arrived at by substantially maintaining the desired rotor resistance for high starting torque, accompanied by adequate low reluctance paths for the magnetic flux passing from the stator to the inner core. The ultimate result, as depicted by the relatively few comparisons to a conventional motor as enumerated above, was a rotor shell thickness reduced to approximately 5% of the rotor diameter, which materially reduces rotor inertia. Thus the novel rotor of this invention comprises a thin composite shell of a low resistance, high permeability metal whose effective permeability is increased by the insertion of magnetic inserts so that the resulting radial magnetic circuit comprises a low reluctance material in parallel with a high reluctance material and the resulting axial electric circuit comprises a low resistance material in parallel with a high resistance material.

The applicability of the above invention is manifest in any size motor, alternating or direct current type, and other electromagnetic machinery such as selsyn motors.

It will be apparent that the embodiments shown are only exemplary and that various modifications can be made in construction and arrangement within the scope of the invention as defined in the appended claims.

I claim:

1. An improved rotor for providing extremely fast starting and reversing in an induction motor while maintaining the power output, said rotor comprising: a cylindrical magnetic core rotatably mounted on a shaft, a cylindrical shell coaxial with said core and rigidly attached to said shaft, said shell having a thickness of not more than 5% of its diameter, the air gap between said core and said shell being just sufficient to permit rotation therebetween, said shell having an axially extending electrical circuit and a radially extending magnetic circuit, said electrical circuit being composed of a low resistance material in parallel with a high resistance material, and said magnetic circuit being composed of a low reluctance material in parallel with a high reluctance material.

2. The invention in accordance with claim 1 wherein said low reluctance material comprises a plurality of ferromagnetic discs disposed within said shell and extending therethrough.

3. The invention in accordance with claim 1, wherein said low reluctance material comprises a plurality of ferromagnetic bars embedded in said shell and extending therethrough.

References Cited in the file of this patent

UNITED STATES PATENTS

| | | |
|---|---|---|
| 295,534 | Frick | Mar. 25, 1884 |
| 1,227,185 | Neuland | May 22, 1917 |
| 1,576,002 | Packard | Mar. 9, 1926 |
| 1,595,550 | Howard | Aug. 10, 1926 |
| 2,020,090 | Weed | Nov. 5, 1935 |
| 2,159,768 | Macmillan | May 23, 1939 |
| 2,300,482 | Barnes | Nov. 3, 1942 |
| 2,402,214 | Suydam | June 18, 1946 |
| 2,492,678 | Amtsberg | Dec. 27, 1949 |
| 2,542,659 | Gillett | Feb. 20, 1951 |

FOREIGN PATENTS

| | | |
|---|---|---|
| 103,184 | Australia | Feb. 2, 1938 |
| 501,432 | Great Britain | May 22, 1937 |
| 512,477 | Canada | May 3, 1955 |